United States Patent [19]

Saotome et al.

[11] Patent Number: 4,861,994

[45] Date of Patent: Aug. 29, 1989

[54] METHOD OF MEASURING AFTER-GLOW OF STIMULABLE PHOSPHOR SHEET, AND METHOD OF ADJUSTING RADIATION IMAGE READ-OUT CONDITIONS

[75] Inventors: Shigeru Saotome; Tsutomu Kimura; Nobuyoshi Nakajima, all of Kanagawa, Japan

[73] Assignee: Fuji Photo Film Co., Ltd., Kanagawa, Japan

[21] Appl. No.: 63,052

[22] Filed: Jun. 17, 1987

[30] Foreign Application Priority Data

Jun. 17, 1986 [JP] Japan ............................. 61-141168
Jun. 26, 1986 [JP] Japan ............................. 61-150225

[51] Int. Cl.$^4$ ............................................. G03B 42/00
[52] U.S. Cl. ............................. 250/327.2; 250/484.1
[58] Field of Search .......... 250/327.2, 484.1, 327.2 G, 250/484.1 B

[56] References Cited

U.S. PATENT DOCUMENTS

| | | | |
|---|---|---|---|
| 4,496,973 | 1/1985 | Horikawa et al. | 358/111 |
| 4,571,493 | 2/1986 | Horikawa | 250/327.2 |
| 4,582,988 | 4/1986 | Aagano | 250/327.2 |
| 4,638,162 | 1/1987 | Tanaka et al. | 250/327.2 |
| 4,749,861 | 6/1988 | Watanabe et al. | 250/327.2 |

FOREIGN PATENT DOCUMENTS 0183063 6/1986 European Pat. Off. ......... 250/484.1

Primary Examiner—Constantine Hannaher
Attorney, Agent, or Firm—Sughrue, Mion, Zinn, Macpeak & Seas

[57] ABSTRACT

A method of measuring an after-glow of a stimulable phosphor sheet comprises the step of detecting an instantaneous light emission after-glow emanated by the stimulable phosphor sheet carrying a radiation image stored thereon by use of a photodetector when the stimulable phosphor sheet is being conveyed toward a system for final read-out after preliminary read-out is finished, thereby measuring the level of the after-glow. A method of adjusting radiation image read-out conditions comprises the steps of creating a histogram of preliminary read-out image signals obtained by preliminary read-out, detecting the instantaneous light emission after-glow by a photodetector, obtaining a signal Sx representing the level of the instantaneous light emission after-glow, and adjusting final read-out conditions and/or image processing conditions based on a value calculated by subtracting the value of the signal Sx from a characteristic value of the preliminary read-out image signals in the histogram.

5 Claims, 2 Drawing Sheets

METHOD OF MEASURING AFTER-GLOW OF STIMULABLE PHOSPHOR SHEET, AND METHOD OF ADJUSTING RADIATION IMAGE READ-OUT CONDITIONS

BACKGROUND OF THE INVENTION

1. Field of the Invention

This invention relates to a method of measuring the level of an after-glow of a stimulable phosphor sheet in a radiation image read-out method for reading out a radiation image stored on a stimulable phosphor sheet by exposing the stimulable phosphor sheet to stimulating rays which cause it to emit light in proportion to the stored radiation energy, and detecting the emitted light. This invention also relates to a method of adjusting radiation image read-out conditions to optimal values in the radiation image read-out method.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then exposed to a stimulating ray beam such as a laser beam which causes the stimulable phosphor sheet to emit light in proportion to the stored radiation energy. The light emitted by the stimulable phosphor sheet upon stimulation thereof is photoelectrically detected and converted to an electric image signal, and the radiation image of the object is reproduced as a visible image by use of the image signal on a recording medium such as a photographic film, a display device such as a cathode ray tube (CRT), or the like.

The radiation image recording and reproducing system using a stimulable phosphor sheet is advantageous over conventional radiography using a silver halide photographic material in that the image can be recorded over a very wide range of radiation exposure and further in that the electric signal used for reproducing the visible image can be freely processed to improve the image quality for viewing, particularly for diagnostic purposes. More specifically, since the amount of light emitted upon stimulation after the radiation energy is stored on the stimulable phosphor sheet varies over a wide range in proportion to the amount of said stored energy, it is possible to obtain an image having a desirable density regardless of the amount of exposure of the stimulable phosphor sheet to the radiation, by reading out the emitted light with an appropriate read-out gain and converting it into an electric signal to reproduce a visible image on a recording medium or a display device. The electric signal may further be processed as desired to obtain a radiation image suitable for viewing, particularly for diagnostic purposes. This is very advantageous in practical use.

As mentioned above, in the radiation image recording and reproducing system using a stimulable phosphor sheet, compensation for deviation of the level of the radiation energy stored on the stimulable phosphor sheet from a desired level can easily be carried out by adjusting the read-out gain to an appropriate value when photoelectrically reading out the light emitted by the stimulable phosphor sheet upon stimulation thereof. Therefore, the quality of the reproduced radiation image is not adversely affected by a fluctuation in radiation dose due to fluctuating tube voltage or MAS value of the radiation source, variation in the sensitivity of the stimulable phosphor sheet or the photodetector, changes in radiation dose resulting from differences in the condition of the object, and the like. Also, it is possible to obtain a desirable radiation image even when the radiation dose to the object is low. Further, it is possible to obtain a radiation image having a high image quality of high contrast, high sharpness and low noise, and the like, by converting the light emitted by the stimulable phosphor sheet into an electric signal, and processing the electric signal as desired.

However, in order to eliminate various influences caused by variations in radiographic exposure conditions and/or to obtain a radiation image having a high image quality or a high diagnostic efficiency and accuracy, it is necessary to ascertain such image input conditions of the radiation image stored on the stimulable phosphor sheet as, for example, the level of radiation dose used for image recording, or the image input pattern which is determined by the portion of the object (e.g. the chest or the abdomen of the human body) or the image recording method used, such as plain image recording or contrasted image recording, before reproducing the radiation image to a visible image, and then to adjust the read-out gain to an appropriate value or to process the electric signal appropriately based on the ascertained image input conditions or the image input pattern. The image input conditions and the image input pattern will hereinafter be simply referred to as the image input information when they are referred to generically. It is also necessary to adjust the scale factor to optimize the resolution in accordance with the contrast of the image input pattern, and to adjust image processing conditions to appropriate values in the case where image processing such as gradation processing is carried out on the read-out image signal.

Ascertaining of the image input information may be carried out prior to the visible image reproduction by use of the method as disclosed in Japanese Unexamined Patent Publication No. 58(1983)-67240. In the disclosed method, a read-out operation for ascertaining the image input information of a radiation image stored on a stimulable phosphor sheet (hereinafter referred to as the preliminary read-out) is carried out in advance by use of stimulating rays having stimulation energy of a level lower than the level of the stimulation energy of stimulating rays used in a read-out operation for obtaining a visible image for viewing, particularly for diagnostic purposes (hereinafter referred to as the final read-out), and thereafter the final read-out is carried out. In the final read-out, the read-out gain and/or the scale factor is adjusted to an appropriate value, and/or an appropriate image processing is conducted, on the basis of the image input information obtained by the preliminary read-out.

As mentioned above, the level of stimulation energy of the stimulating rays used in the preliminary read-out is lower than the level of stimulation energy of the stimulating rays used in the final read-out. Specifically, the effective energy of the stimulating rays which the stimulable phosphor sheet receives per unit area in the preliminary read-out should be lower than the effective energy of the stimulating rays used in the final read-out.

Various methods may be used for approximately ascertaining the image input information on the stimulable phosphor sheet from preliminary read-out image signals obtained by the aforesaid preliminary read-out. One method is to utilize a histogram of the preliminary read-out image signals. Specifically, the image input information can be ascertained from, for example, a characteristic value such as the maximum signal value, the minimum signal value, or a signal value at a point where the frequency is the maximum in the histogram. Therefore, a visible radiation image can be reproduced by adjusting the read-out conditions such as the read-out gain and the scale factor (latitude) and/or the image processing conditions on the basis of the characteristic value.

However, the read-out conditions for the final read-out and/or the image processing conditions adjusted in the manner as mentioned above are often adversely affected by an instantaneous light emission after-glow emanated from the stimulable phosphor sheet, and become inappropriate for the actual image input information on the stimulable phosphor sheet. By "instantaneous light emission after-glow" is meant the after-glow of light instantaneously emitted by a stimulable phosphor sheet when the sheet is exposed to a radiation to have a radiation image stored thereon, the after-glow continuing to be emitted by the sheet for a considerable period of time, for example, for a period within the range of several seconds to several tens of seconds, after the exposure of the sheet to the radiation is ceased. Therefore, signal components caused by the instantaneous light emission after-glow are naturally contained in the preliminary read-out image signals, and the levels of the preliminary read-out image signals become higher as a whole than the signal components representing the actual image information. As a result, the histogram of the preliminary read-out image signals shifts to the large signal value side (i.e. large light emission amount side), and does not correctly reflect the actual image input information. That is, the histogram becomes as if it were created for an image having a density higher as a whole than the density of the image actually stored on the stimulable phosphor sheet.

Therefore, if the radiation image stored on the stimulable phosphor sheet is read out by use of the read-out conditions or the like adjusted based on such a histogram and a visible image is reproduced by use of the image signals detected in this manner, image density may fail to be formed at the low density region of the reproduced visible image.

Besides the adverse effects on the read-out conditions for the final read-out and/or the image processing conditions as mentioned above, the instantaneous light emission after-glow is detected also in the course of the final read-out, and noise components caused by the instantaneous light emission after-glow are contained in the final read-out image signals, thereby adversely affecting the image quality of the reproduced radiation image.

In order to eliminate the aforesaid problems, it has been proposed in, for example, Japanese Patent Application No. 58(1983)-108238, corresponding to U.S. Pat. No. 4,571,493 to subtract signal components caused by the instantaneous light emission after-glow from the image signals, and to process the image signals obtained by the subtraction as signals representing the actual radiation image stored on a stimulable phosphor sheet. For carrying out such subtraction processing, it is first necessary to accurately measure the level of the instantaneous light emission after-glow. For this purpose, as disclosed also in the aforesaid Japanese Patent Application No. 58(1983)-108238, corresponding to U.S. Pat. No. 4,571,493 the level of the instantaneous light emission after-glow has heretofore been carried out by sampling the output of a light detection means when stimulating rays for scanning the stimulable phosphor sheet have finished scanning along a single scanning line in a main scanning direction and are not then impinging upon the stimulable phosphor sheet.

However, with the aforesaid method of measuring the level of the instantaneous light emission after-glow, a signal representing the radiation image of the object and a signal representing the level of the instantaneous light emission after-glow are alternately generated by the light detection means. Therefore, complicated processing is necessary for separation of the signal representing the radiation image of the object and the signal representing the level of the instantaneous light emission after-glow from each other, or the like.

SUMMARY OF THE INVENTION

The primary object of the present invention is to provide a method of measuring the level of an instantaneous light emission after-glow of a stimulable phosphor sheet in a simple manner.

Another object of the present invention is to provide a method of adjusting radiation image read-out conditions by eliminating adverse effects of the instantaneous light emission after-glow of a stimulable phosphor sheet.

The present invention provides, in a radiation image read-out method in which final read-out is carried out for obtaining image signals for use in reproduction of a visible image by exposing a stimulable phosphor sheet carrying a radiation image stored thereon to stimulating rays, and photoelectrically detecting light emitted by the stimulable phosphor sheet in proportion to the stored radiation energy upon exposure to the stimulating rays by use of a light detection means, and preliminary read-out for approximately detecting image input information stored on the stimulable phosphor sheet is carried out prior to the final read-out, a method of measuring an after-glow of a stimulable phosphor sheet, which comprises the step of:

detecting an instantaneous light emission after-glow emanated by said stimulable phosphor sheet by use of a light detection means in the course of conveyance of said stimulable phosphor sheet toward a final read-out system after said preliminary read-out is finished, thereby measuring the level of said after-glow.

The present invention also provides, in a radiation image read-out method in which final read-out is carried out for obtaining image signals for use in reproduction of a visible image by exposing a stimulable phosphor sheet carrying a radiation image stored thereon to stimulating rays, and photoelectrically detecting light emitted by the stimulable phosphor sheet in proportion to the stored radiation energy upon exposure to the stimulating rays by use of a light detection means, and preliminary read-out for approximately detecting image input information stored on the stimulable phosphor sheet is carried out prior to the final read-out, a method of adjusting radiation image read-out conditions, which comprises the steps of:

(i) creating a histogram of preliminary read-out image signals obtained by said preliminary read-out, (ii) detecting an instantaneous light emission after-glow emanated by said stimulable phosphor sheet by use of a light detection means, and obtaining a signal Sx representing the level of said instantaneous light emission after-glow, and (iii) adjusting read-out conditions for said final read-out and/or image processing conditions on the basis of a value calculated by subtracting the value of said signal Sx from a characteristic value (the maximum signal value, the minimum signal value, or the like) of said preliminary read-out image signals in said histogram.

With the method of measuring an after-glow of a stimulable phosphor sheet in accordance with the present invention, since the level of the instantaneous light emission after-glow can be measured accurately, it becomes possible to adjust the read-out conditions for the final read-out and/or the image processing conditions to values optimal for the actual image input information by eliminating adverse effects of the instantaneous light emission after-glow. Also, since the final read-out image signals for use in reproduction of a visible radiation image can be corrected accurately, it becomes possible to obtain a reproduced visible radiation image having an improved image quality, particularly a high diagnostic efficiency and accuracy. Further, since measurement of the level of the instantaneous light emission after-glow is carried out between the preliminary read-out step and the final read-out step, processing for separation of the signals representing the radiation image stored on the stimulable phosphor sheet and the signal representing the level of the instantaneous light emission after-glow from each other need not be carried out. Therefore, the method of measuring an after-glow of a stimulable phosphor sheet in accordance with the present invention can be carried out by use of a simple apparatus.

With the method of adjusting radiation image read-out conditions in accordance with the present invention, the read-out conditions for the final read-out and/or the image processing conditions can be adjusted to values optimal for the actual image input information by eliminating adverse effects of the instantaneous light emission after-glow. Therefore, it is possible to obtain a reproduced visible radiation image having an improved image quality, particularly a high diagnostic efficiency and accuracy.

In the method of adjusting radiation image read-out conditions in accordance with the present invention, the signal Sx representing the level of the instantaneous light emission after-glow may be obtained by the method as disclosed in, for example, Japanese Patent Application No. 58(1983)-108238, corresponding to U.S. Pat. No. 4,571,493. Or, in the case of a radiation image readout apparatus wherein a single common read-out system is provided for carrying out both the preliminary read-out and the final read-out, and the final read-out is carried out by returning the stimulable phosphor sheet to the read-out system after the preliminary read-out is finished, the signal Sx may be obtained by ceasing emanation of stimulating rays to the stimulable phosphor sheet and measuring the output of the light detection means in the course of returning the stimulable phosphor sheet to the read-out system after the preliminary read-out is finished.

The value calculated by subtracting the signal Sx from the characteristic value of the preliminary read-out image signals in the histogram constitutes a characteristic value representing the true image input information free from adverse effects of the instantaneous light emission afterglow. Accordingly, when the read-out conditions for the final read-out and/or the image processing conditions are adjusted based on the value thus calculated, the adjusted conditions become appropriate for the actual image input information.

DESCRIPTION OF THE PREFERRED EMBODIMENTS

The present invention will hereinbelow be described in further detail with reference to the accompanying drawings.

Figure 1:
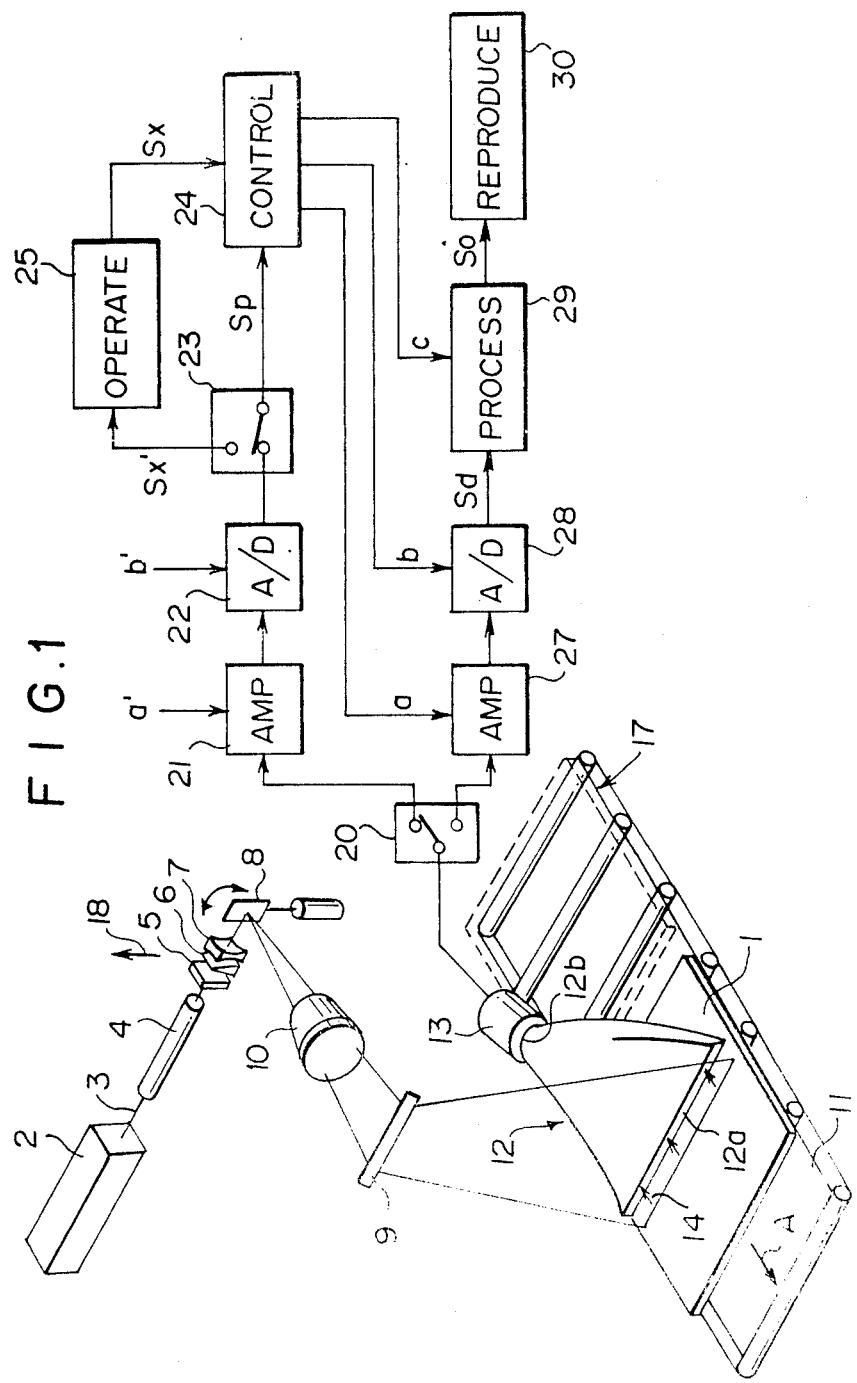
FIG. 1 is a schematic view showing an example of the radiation image read-out apparatus for carrying out an embodiment of the method of measuring an after-glow of a stimulable phosphor sheet in accordance with the present invention and an embodiment of the method of adjusting radiation image read-out conditions in accordance with the present invention.

A stimulable phosphor sheet 1 carrying a radiation image of an object stored thereon by being exposed to a radiation such as X-rays passing through the object is sent to an radiation image read-out apparatus shown in FIG. 1. In the radiation image read-out apparatus, preliminary readout is first carried out on the stimulable phosphor sheet 1. A laser beam 3 emanated by a laser beam source 2 is passed through a beam expander 4, and the beam diameter of the laser beam 3 is strictly adjusted. Then, the laser beam 3 is passed through an ND filter 5, a prism 6 and a concave lens 7 to reduce the strength of the laser beam 3 and increase the beam diameter thereof. The laser beam 3 is then deflected by a light deflector 8 formed of a galvanometer mirror or the like, and is made to impinge upon the stimulable phosphor sheet 1 by a plane reflection mirror 9. In this manner, the stimulable phosphor sheet 1 is linearly scanned by the laser beam 3. Between the light deflector 8 and the plane reflection mirror 9 is disposed an fθ lens 10 for maintaining the beam diameter of the laser beam 3 uniform in the course of the scanning of the laser beam 3 on the stimulable phosphor sheet 1. The laser beam source 2 is selected so that the laser beam 3 emanated thereby has a wavelength distribution different from and far apart from the wavelength distribution of the light emitted by the stimulable phosphor sheet 1 upon stimulation thereof. While the laser beam 3 impinges upon the stimulable phosphor sheet 1, the stimulable phosphor sheet 1 is moved in the direction as indicated by the arrow A (i.e. in the sub-scanning direction) by a sheet conveyance means 11 constituted by an endless belt or the like and, consequently, the overall area of the stimulable phosphor sheet 1 is exposed to and scanned by the laser beam 3. Upon exposure to the laser beam 3, the exposed portion of the stimulable phosphor sheet 1 emits light 14 in an amount proportional to the radiation energy stored thereon, and the emitted light 14 enters a light guide member 12. The light guide member 12 has a linear light input face 12a disposed close to the scanning line on the stimulable phosphor sheet 1, and a ring-shaped light output face 12b in close contact with the light receiving face of a photodetector 13, which may be a photomultiplier. The light guide member 12 is fabricated of a transparent thermoplastic resin sheet such as an acrylic resin sheet so that the light entering from the light input face 12a can be transmitted to the light output face 12b by total reflection inside of the light guide member 12. The light 14 emitted by the stimulable phosphor sheet 1 upon stimulation thereof is guided inside of the light guide member, emanated from the light output face 12b of the light guide member 12, and received by the photodetector 13. The light guide member 12 may be of a shape and a material as disclosed in U.S. Pat. No. 4,346,295.

The light receiving face of the photodetector 13 is provided with a filter (not shown) for transmitting only the light having the wavelength distribution of the light 14 emitted by the stimulable phosphor sheet 1 and cutting off the light having the wavelength distribution of the laser beam 3 as stimulating rays, so that the photodetector 13 can detect only the light 14 emitted by the stimulable phosphor sheet 1 upon stimulation thereof. The output of the photodetector 13 is sent to an amplifier 21 for the preliminary read-out via a switch 20 and is amplified thereby. The signals generated by the amplifier 21 are digitized by an A/D converter 22, and sent as preliminary read-out image signals Sp to a final read-out control circuit 24 via a switch 23. On the basis of the image input information which the preliminary read-out image signals Sp represent, the final read-out control circuit 24 calculates a read-out gain setting value (a), a scale factor setting value (b), and an image processing condition setting value (c) by means of histogram analysis as will be described in detail later. The read-out gain of the amplifier 21 for the preliminary read-out is fixed at a predetermined value a', and the scale factor of the A/D converter 22 is fixed at a predetermined value b'.

After the preliminary read-out is finished as mentioned above, the sheet conveyance means 11 is operated reversely to return the stimulable phosphor sheet 1 to a readout start position 17, and then the final read-out is started. When the stimulable phosphor sheet 1 is returned in this manner, the laser beam source 2 is deactivated, and the photodetector 12 is maintained in the operating condition. Therefore, at this time, no emitted light 14 is detected, but instead the instantaneous light emission after-glow continuing to be emanated by the stimulable phosphor sheet 1 after the sheet 1 was exposed to the radiation for image recording is detected by the photodetector 12. The output of the photodetector 12 representing the level of the instantaneous light emission after-glow is amplified by the amplifier 21, converted into digital signals Sx' by the A/D converter 22, and fed through the switch 23 to an operation circuit 25. The operation circuit 25 calculates the mean value of the digital signals Sx', and generates an after-glow level signal Sx representing the mean after-glow level of the single stimulable phosphor sheet 1.

The final read-out is carried out as described below. In the final read-out, the laser beam 3 is emanated by the laser beam source 2 in the same manner as in the preliminary read-out. However, in the final read-out, the ND filter 5, the prism 6 and the concave lens 7 are moved away from the optical path in the direction as indicated by the arrow 18. Therefore, the level of stimulation energy of the laser beam 3 (stimulating rays) becomes higher than the level of the stimulation energy of the stimulating rays in the preliminary read-out step. By the term "stimulation energy of stimulating rays" as used herein is meant the effective stimulation energy of the stimulating rays which the stimulable phosphor sheet 1 receives per unit area. As the ratio of the stimulation energy of the stimulating rays in the preliminary read-out to the stimulation energy of the stimulating rays in the final read-out increases, the amount of radiation energy remaining on the stimulable phosphor sheet 1 after the preliminary read-out decreases. It has been found that, when the aforesaid ratio is smaller than one, it is possible to obtain a radiation image suitable for viewing, particularly for diagnostic purposes, by adjusting the final read-out gain to an appropriate value. However, in order to obtain a radiation image having an improved image quality, particularly a high diagnostic efficiency and accuracy, the aforesaid ratio should preferably be as small as possible insofar as the image input information of the radiation image stored on the stimulable phosphor sheet 1 can be detected sufficiently to permit adjustment of the final read-out conditions and/or the image processing conditions, that is, insofar as the light 14 emitted by the stimulable phosphor sheet 1 in the preliminary read-out can be detected sufficiently for the above-mentioned purposes. Thus, the aforesaid stimulation energy ratio should generally be 50% or less, preferably 10% or less, more preferably 3% or less. The lower limit of this ratio is determined in accordance with the accuracy of the system for detecting the light 14 emitted by the stimulable phosphor sheet 1 in the preliminary read-out.

In the same manner as in the preliminary read-out step, the overall surface of the stimulable phosphor sheet 1 is exposed to the laser beam 3. Upon exposure to the laser beam 3, the exposed portion of the stimulable phosphor sheet 1 emits light 14 of a level proportional to the stored radiation energy. The emitted light 14 enters the light guide member 12, is guided inside thereof, and is detected by the photodetector 13. The output of the photodetector 13 is fed through the switch 20 to an amplifier 27 for the final read-out, and is amplified to an appropriate level by the amplifier 27 the sensitivity of which has been adjusted based on the read-out gain setting value (a). The amplified electric signals are fed to an A/D converter 28 which converts the electric signals into digital signals Sd by use of a scale factor (latitude) which has been adjusted based on the scale factor setting value (b) to suit the width of signal fluctuation. The digital signals Sd thus obtained are fed to a signal processing circuit 29, in which they are subjected to a signal processing (image processing) based on the image processing condition setting value (c) so as to obtain a visible radiation image suitable for viewing, particularly for diagnostic purposes. The digital signals So obtained by the signal processing are sent to an image reproducing apparatus 30 for reproducing the radiation image as a visible image. For the signal processing carried out by the signal processing circuit 29, it is possible to employ frequency response processing as disclosed in U.S. Pat. Nos. 4,315,318, 4,346,295 or 4,387,428, or European Patent Publication No. 31,952, and gradation processing as disclosed in U.S. Pat. Nos. 4,302,672, 4,276,473 or 4,310,886.

The image reproducing apparatus 30 reproduces a visible radiation image based on the image signals So received from the signal processing circuit 29. For reproducing the visible image, it is possible to employ any appropriate method. For example, a visible image may be recorded on a photosensitive material by scanning it with a laser beam, or may be electronically displayed on a display device such as a CRT. Or, the final radiation image may be recorded by use of a video tape recorder or a printer. Alternatively, the radiation image may be reproduced on a thermosensitive recording material by use of heat waves.

With the radiation image read-out apparatus shown in FIG. 1, the image input information on the stimulable phosphor sheet 1 is ascertained in advance by the preliminary read-out, the final read-out is carried out by use of the read-out gain setting value (a) and/or the scale factor setting value (b) adjusted to appropriate values based on the ascertained image input information, and/or the image processing is carried out based on the image processing condition setting value (c) adjusted to an appropriate value. Therefore, a visible radiation image having an improved image quality, particularly a high diagnostic efficiency and accuracy, can be reproduced by the image reproducing apparatus 30.

Figure 2:
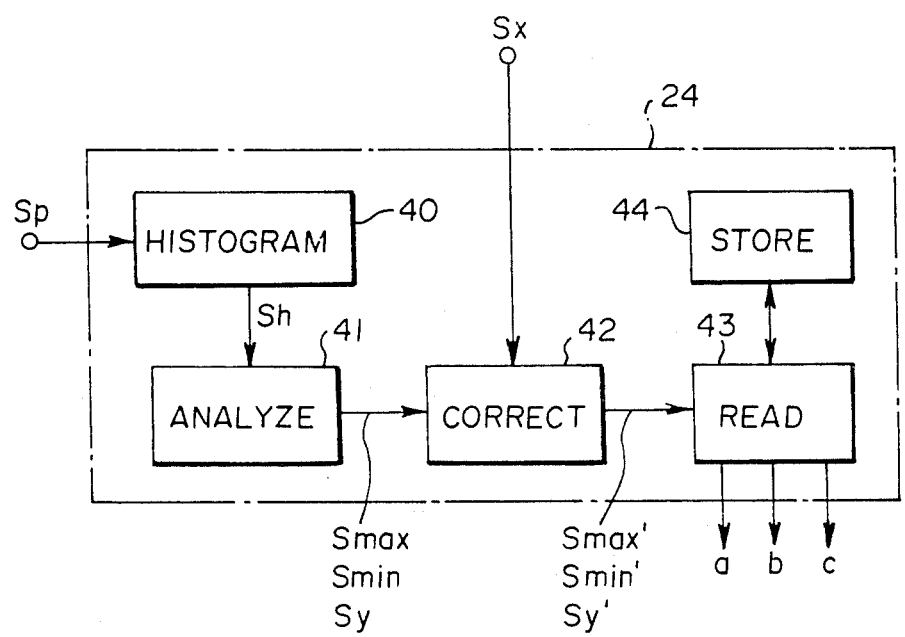
FIG. 2 is a block diagram showing in detail a part of the apparatus shown in FIG. 1.
Figure 3:
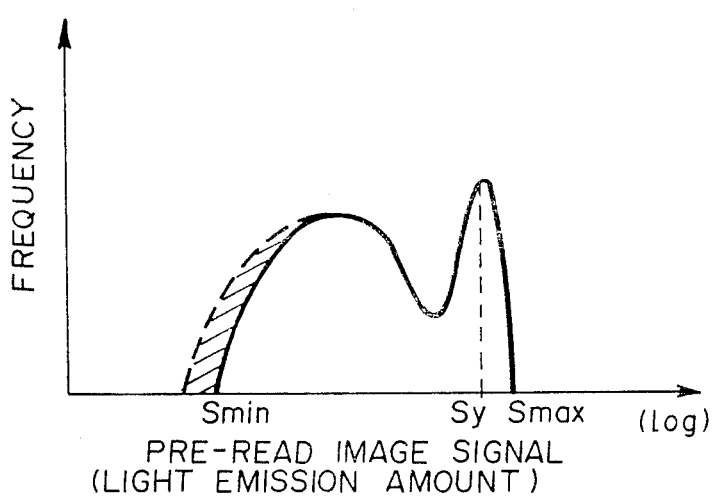
FIG. 3 is an explanatory view showing correction of a histogram and a characteristic value of preliminary readout image signals in accordance with the present invention.

Adjustment of the read-out gain setting vale (a), the scale factor setting value (b), and the image processing condition setting value (c) to appropriate values by elimination of the adverse effects of the aforesaid instantaneous light emission after-glow will be described hereinbelow. As shown in detail in FIG. 2, the final read-out control circuit 24 is composed of a histogram creating section 40, a histogram analysis section 41, a correcting section 42, a read section 43 and a storage section 44. The aforesaid preliminary read-out image signals Sp are fed to the histogram creating section 40, which creates a histogram of all of the preliminary read-out image signals Sp. The histogram becomes as indicated by, for example, the solid line in FIG. 3. However, since signal components caused by the aforesaid instantaneous light emission after-glow are also contained in the preliminary read-out image signals Sp, the histogram of the true image input information should become as indicated by the broken line in FIG. 3. Specifically, the histogram is caused by the instantaneous light emission after-glow to shift toward the large signal value side (i.e. the large light emission amount side) to an extent as indicated by the hatching in FIG. 3. Histogram information Sh representing the histogram is fed to the histogram analysis section 41, which analyzes the histogram represented by the histogram information Sh, and calculates characteristic values of the histogram, for example, the maximum value Smax, the minimum value Smin, and a signal value Sy at which the frequency is the maximum in the histogram. The storage section 44 stores the read-out gain setting value (a), the scale factor setting value (b), and the image processing condition setting value (c) suitable for the characteristic values Smax, Smin and Sy. The read section 43 reads the setting values (a), (b) and (c) corresponding to the characteristic values from the storage section 44, and sends them respectively to the amplifier 27, the A/D converter 28, and the signal processing circuit 29. However, the characteristic values Smax, Smin and Sy calculated by the histogram analysis section 41 are not directly sent to the read section 43, but instead are stored in a storage means (not shown) of the correcting section 42. After receiving the aforesaid after-glow level signal Sx, the correcting section 42 subtracts the after-glow level signal Sx from the characteristic values Smax, Smin and Sy, and characteristic values Smax', Smin' and Sy' corrected in this manner are sent to the read section 43. Since the after-glow level signal Sx represents the mean level of the instantaneous light emission after-glow of the stimulable phosphor sheet 1 as mentioned above, the corrected characteristic values Smax', Smin' and Sy' represent the true image input information free from adverse effects of the instantaneous light emission afterglow. Therefore, the read-out gain setting value (a), the scale factor setting value (b), and the image processing condition setting value (c) adjusted based on the corrected characteristic values Smax', Smin' and Sy' become optimal for the true image input information. Accordingly, at the image reproducing apparatus 30, it is possible to obtain a visible image having a high image quality free from a failure of formation of image density at the low density image region.

In general, the difference between the minimum value Smin and the maximum value Smax of the preliminary read-out image signals Sp is not smaller than approximately 2 orders of ten. Therefore, the effects of the correction of the characteristic values by subtraction become most marked at the minimum signal value Smin. (In FIG. 3, the horizontal axis for the signal values is the logarithmic coordinate axis.)

In the aforesaid embodiment, the level of the instantaneous light emission after-glow is detected when the stimulable phosphor sheet 1 passes through the light emission detecting system in the course of returning the sheet 1 to the read-out start position after the preliminary read-out is finished. In the case where the preliminary read-out system and the final read-out system are disposed independently of each other, a light detection means may be disposed therebetween for measuring the level of the instantaneous light emission after-glow. However, the configuration of the aforesaid embodiment is advantageous for reducing the cost of the apparatus and simplifying the apparatus configuration since the light detection means for detecting the light emitted by the stimulable phosphor sheet can be utilized also for the measurement of the level of the instantaneous light emission after-glow.

Also, in the aforesaid embodiment, the characteristic values of the histogram are corrected based on the mean after-glow level on the single stimulable phosphor sheet 1. However, instead, the level of the instantaneous light emission after-glow may be measured for each of the main scanning lines, the preliminary read-out image signals Sp may be corrected for each of the main scanning lines in accordance with the measurement results, and the read-out conditions for the final read-out and/or the image processing conditions may be adjusted based on the histogram of the corrected preliminary read-out image signals. In this case, the read-out conditions for the final read-out and/or the image processing conditions can be adjusted to appropriate values even though the amount of exposure to the radiation and, consequently, the level of the instantaneous light emission after-glow differ largely among different portions of a single stimulable phosphor sheet.

The method of measuring an after-glow of a stimulable phosphor sheet in accordance with the present invention can be applied for adjusting the read-out conditions for the final read-out and/or the image processing conditions to appropriate values as mentioned above, and for correcting the final read-out image signals So by subtracting the components caused by the instantaneous light emission after-glow from the final read-out image signals So. In the latter case, the final read-out image signals So should preferably be corrected for each of the main scanning lines.

In the method of adjusting radiation image read-out conditions in accordance with the present invention, the level of the instantaneous light emission after-glow may also be measured by sampling the output of the photodetector 13 when the laser beam 3 is outside of the stimulable phosphor sheet 1 after finishing scanning along one scanning line in the main scanning direction as disclosed, in, for example, Japanese Patent Application No. 58(1983)-108238 corresponding to U.S. Pat. No. 4,571,493.

We claim:

1. In a radiation image read-out method in which final read-out is carried out for obtaining image signals for use in reproduction of a visible image by exposing a stimulable phosphor sheet carrying a radiation image stored thereon to stimulating rays, and photoelectrically detecting light emitted by the stimulable phosphor sheet in proportion to the stored radiation energy upon exposure to the stimulating rays by use of a light detection means, and preliminary read-out for approximately detecting image input information stored on the stimulable phosphor sheet is carried out prior to the final read-out, detecting an instantaneous light emission after-glow emanated by said stimulable phosphor sheet by use of a light detection means in the course of conveyance of said stimulable phosphor sheet toward a final read-out system after said preliminary read-out is finished so as to measure the level of said after-glow and, compensating said final read-out in accordance with the measured level of after-glow.

2. A method as defined in claim 1 wherein said preliminary read-out and said final read-out are carried out by use of a common read-out system, and said instantaneous light emission after-glow is detected by use of the light detection means of said common read-out system in the course of returning said stimulable phosphor sheet to a read-out start position in said common read-out system after said preliminary red-out is finished.

3. In a radiation image read-out method in which final read-out is carried out for obtaining image signals for use in reproduction of a visible image by exposing a stimulable phosphor sheet carrying a radiation image stored thereon to stimulating rays, and photoelectricity detecting light emitted by the stimulable phosphor sheet in proportion to the stored radiation energy upon exposure to the stimulating rays by use of a light detection means, and preliminary read-out for approximately detecting image input information stored on the stimulable phosphor sheet is carried out prior to the final read-out, a method of adjusting radiation image read-out conditions, which comprises the steps of:
(i) creating a histogram of preliminary read-out image signals obtained by said preliminary read-out,
(ii) detecting an instantaneous light emission after-glow emanated by said stimulable phosphor sheet by use of a light detection means in the course of conveyance of said stimulable phosphor sheet toward a final read-out system after said preliminary read-out is finished, and obtaining a signal Sx representing the level of said instantaneous light emission after-glow, and
(iii) adjusting read-out conditions for said final read-out and/or image processing conditions on the basis of a value calculated by subtracting the value of said signal Sx from a characteristic value of said preliminary readout image signals in said histogram.

4. A method of adjusting radiation image read-out conditions as defined in claim 3 wherein said preliminary read-out and said final read-out are carried out by use of a common read-out system, and said instantaneous light emission after-glow is detected by use of the light detection means of said common read-out system in the course of returning said stimulable phosphor sheet to a read-out start position in said common read-out system after said preliminary read-out is finished.

5. A method of adjusting radiation image read-out conditions as defined in claim 3 wherein said signal Sx represents the mean level of said instantaneous light emission after-glow.

* * * * *